(12) United States Patent
Deck

(10) Patent No.: US 7,324,272 B1
(45) Date of Patent: Jan. 29, 2008

(54) SPECTROSCOPIC MICROSCOPE WITH MULTI-MODE ILLUMINATION

(75) Inventor: Francis J. Deck, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 0 days.

(21) Appl. No.: 11/345,765

(22) Filed: Feb. 2, 2006

(51) Int. Cl.
*G02B 21/06* (2006.01)

(52) U.S. Cl. ...................... 359/385; 359/379

(58) Field of Classification Search ........... 359/372, 359/379
See application file for complete search history.

(56) References Cited

U.S. PATENT DOCUMENTS

| | | | |
|---|---|---|---|
| 5,729,383 A | 3/1998 | Chastang et al. | |
| 5,734,498 A | 3/1998 | Krasieva et al. | |
| 5,818,637 A * | 10/1998 | Hoover et al. | 359/381 |
| 6,347,009 B1 * | 2/2002 | Takeuchi | 359/385 |
| 6,693,280 B2 | 2/2004 | Sting et al. | |
| 6,809,861 B2 * | 10/2004 | Kawasaki et al. | 359/385 |
| 6,898,005 B2 * | 5/2005 | Kusaka et al. | 359/388 |

OTHER PUBLICATIONS

"Field stop." Academic Press Dictionary of Science and Technology. 1992. Xreferplus. Dec. 13, 2006 <http://www.xreferplus.com/entry/3104539>.*

* cited by examiner

*Primary Examiner*—Stephone B. Allen
*Assistant Examiner*—Derek S. Chapel
(74) *Attorney, Agent, or Firm*—DeWitt Ross & Stevens; Charles B. Katz

(57) ABSTRACT

A spectroscopic microscope allowing both molecular spectrometry and visible microscopy of a sample has a light source for its spectrometer which provides Koehler illumination of the sample, i.e., light from points on the light source is projected across an area of the sample, as opposed to directly projecting an image of the light source onto the sample (as with critical illumination). However, the device may be adjusted to alternatively provide critical illumination of the sample, which is useful where spectrometric readings are to be obtained from a smaller area of the sample.

23 Claims, 2 Drawing Sheets

SPECTROSCOPIC MICROSCOPE WITH MULTI-MODE ILLUMINATION

FIELD OF THE INVENTION

This document concerns an invention relating generally to molecular spectrometers for ascertaining the characteristics of samples by analysis of their ability to absorb, reflect, and/or transmit light, and more specifically to spectrometric microscopes.

BACKGROUND OF THE INVENTION

A spectrometer (sometimes referred to as a spectrograph) is an instrument wherein a solid, liquid, or gaseous sample is illuminated (often with non-visible light, such as light in the infrared region of the spectrum), and the light from the sample is then captured and analyzed to reveal information about the characteristics of the sample. As an example, a sample may be illuminated with infrared light having known intensity across a range of wavelengths, and the light transmitted and/or reflected by the specimen can then be captured for comparison to the illuminating light. Review of the captured spectra (i.e., light intensity vs. wavelength data) can illustrate the wavelengths at which the illuminating light was absorbed by the sample, which in turn can yield information about the chemical bonds present in the sample, and thus its composition and other characteristics.

Spectrometers are sometimes incorporated into spectrometric microscopes, which capture spectra from some small desired area of a sample, and which may also provide a visible magnified image of this area. A common problem with spectrometric microscopes is the quality of the illumination: it is desirable to illuminate a region of interest on a sample with very bright light containing the wavelength(s) of interest, with the light being uniform across the entire region. Unfortunately, this is generally difficult to attain. As an example, infrared illumination of a sample stage (a mount or chamber bearing the sample) is often provided by a high-intensity incandescent lamp, wherein the lamp filament is specially selected to emit light having the desired wavelengths, or an arc lamp which emits light of the desired wavelengths by generating an electrical (plasma) arc between a pair of electrodes in a bulb. Neither type of lamp tends to provide uniform illumination across its area: filaments tend to have "hot spots" which glow more brightly and shift location across the filament over time, and arcs tend to have brightness which varies in both time and location between the lamp electrodes. The spatial and/or time variability in lamp brightness can in turn lead to problems with spectrometric measurements, since nonuniform illumination of a sample can make it seem as if the sample's composition varies across its area: different sample areas will provide greater or lesser light, but it will be unknown whether this is owing to light interaction with the sample (e.g., absorption by the sample), or simply owing to irregular illumination.

Illuminating light can effectively be made more uniform by interjecting a pinhole or other aperture between the lamp and the sample stage, or by interposing diffusers such as frosted glass. However, these greatly reduce light transmission to the sample stage, and thus are usually nonideal. Various correction methods have also been developed to account for nonuniform illumination, such as alternating the illuminating light from the sample stage between its measuring detector (an array of photosensitive elements measuring the light from the sample) and a reference detector. Here, the readings from the measuring detector can be compared to those from the reference detector, and can be "normalized" for variations in intensity seen across the reference detector. Unfortunately, such correction methods are also nonideal since nonuniformities can also exist between detectors, leading to degraded resolution in the resulting spectrometric readings. It would therefore be useful to have available additional methods and devices which at least partially address the difficulties caused by nonuniform illumination.

SUMMARY OF THE INVENTION

The invention involves a spectrometer, and more particularly a spectroscopic microscope, which is intended to at least partially solve the aforementioned problems. To give the reader a basic understanding of some of the advantageous features of the invention, following is a brief summary of preferred versions of the microscope. Since this is merely a summary, it should be understood that more details regarding the preferred versions may be found in the Detailed Description set forth elsewhere in this document. The claims set forth at the end of this document then define the various versions of the invention in which exclusive rights are secured.

To assist the reader's understanding, the following summary will refer to the accompanying FIGS. 1A and 1B, which present simplified schematic views of a portion of a spectroscopic microscope at 100 (including paraxial ray traces of selected light rays from three closely spaced points on a light source 102), and FIG. 2, which presents a more detailed schematic view of a preferred spectroscopic microscope arrangement at 200. Since both arrangements 100/200 are functionally the same, they will be collectively referred to as the spectroscopic microscope 100/200 in the following summary.

The spectroscopic microscope includes the light source 102/202 (here depicted as an incandescent lamp with a filament 104/204 glowing in the desired wavelengths, e.g., in the infrared region, for illuminating a sample 106/206 to be analyzed); a sample stage 108/208 suitable for bearing a sample 106/206 for spectrometric analysis; and a detector 110/210 (e.g., a two-dimensional array of photosensitive elements) receiving light from the sample stage 108/208. An optical system, depicted as a series of optical elements 112, 114, 116, and 118 in FIGS. 1A and 1B, and optical elements 212, 214, 216, and 218 in FIG. 2, is then situated between the light source 102/202 and the sample stage 108/208. At least one of the optical elements in the system is movable with respect to the others so that the optical system may vary between:

a Koehler optical system (FIG. 1A) which disperses light rays from each point on the light source 102/202 across an area on the sample stage 108/208 (and thus the image of the light source 102/202 is not maintained on the sample stage 108/208); and a critical illumination optical system (FIG. 1B) wherein the light rays from each point on the light source 102/202 are directed to corresponding points on the sample stage 108/208 (and thus the image of the light source 102/202 is preserved on the sample stage 108/208).

This allows diffuse Koehler illumination of an area of the sample 106/206, thereby allowing the detector 110/210 to attain readings from a wide field of view with less uncertainty as to the characteristics of the illuminating light. However, if desired, a user could instead utilize critical illumination (the conventional form of illumination in most spectroscopy applications), which directly images a selected region of the light source 102/202 to a corresponding region on the sample 106/206. This is useful, for example, where one only wishes to obtain detector 110/210 readings from a selected small region of interest on the sample 106/206.

Reviewing the optical system of the accompanying drawings in greater detail, the optical system preferably includes at least four optical elements arranged in series: a collector element (lens) 112/212 situated adjacent the light source 102/202 and collecting the light therefrom, first and second condenser elements (lenses) 114/214 and 116/216, wherein the first condenser lens 114/214 focuses the light to an intermediate focal plane (with a field lens 120/220 and/or an aperture 122/222 preferably being situated at the intermediate focal plane, with FIGS. 1A-1B and 2 depicting an adjustable aperture 122/222 situated adjacent the field lens 120/220 at the intermediate focal plane); and an objective element 118/218 adjacent the sample 106/206 which receives the light from the second condenser lens 116/216 and directs it to the sample 106/206. This objective element is provided by a lens 118 in FIGS. 1A and 1B, and by a Schwarzschild objective 218 in the spectrometer of FIG. 2, i.e., a convex primary mirror 218a which supplies a concave secondary mirror 218b. (Also in FIG. 2, a folding minor 228 is provided between the second condensing lens 216 and the objective 218 to change the travel direction of the light.) At least one of the first and second condenser elements 114/214 and 116/216 is adjustably repositionable with respect to the other to adapt the optical system from Koehler to critical illumination (and vice versa) when desired. A particularly preferred arrangement has the second condenser element 116/216 adjustably repositionable with respect to both the collector element 112/212 and the first condenser element 114/214, as illustrated by the different positions of the condenser element 116 in FIGS. 1A-1B. In this manner, the second condenser element 116/216 images the light source 102/202 to the entrance aperture of the objective element 118/218 to have the objective 118/218 distribute the light across an area of the sample 106/206 (as in the Koehler arrangement of FIG. 1A), or to otherwise cooperate with the objective element 118/218 to provide a focused image of the light source 102/202 on the sample 106/206 (as in the critical arrangement of FIG. 1B).

As previously noted, an aperture 122/222 is preferably provided between the first and second condenser elements 114/214 and 116/216. The aperture 122/222 is useful for operation under critical illumination conditions because it can better allow projection of a specific small section of the light source 102/202 (e.g., a particularly bright "hot spot") onto the sample 106/206, by isolating the light transmitted through the aperture 122/222 to include light from this section. Thus, the aperture 122/222 preferably has adjustable size, and could take the form of (for example) an expanding/contracting iris, or a first pair of movable shutters which define a variably-sized slit oriented along one direction, situated adjacent to another pair of such shutters defining another slit along a perpendicular direction (with the two pairs of shutters combining to define a variably-sized pinhole-type aperture). Since the aperture 122/222 may not be useful when the spectrometer 100/200 is operated in the Koehler illumination mode, it is preferably adjustable to such a size that all light transmitted from the light source 102/202 may pass through the aperture 122/222 when it is maximized, thereby allowing maximum light transmission to the sample 106/206. Alternatively or additionally, the aperture 122/222 maybe movable so that it can be entirely moved out of the light transmission path from the light source 102/202 to the sample stage 108/208. It is notable that the aperture 122/222 need not be located at the position shown in the drawings, and could be placed elsewhere between the first and second condenser elements 114/214 and 116/216; for example, it could be provided in place of the field element 120/220 (which is present to help concentrate the light from the first condenser element 114/214 on the second condenser element 116/216). Alternatively or additionally, an aperture 122/222 could be provided at the conjugate plane—a second location where an in-focus image of the light source 102/202 is provided—between the field element 120/220 and the second condenser element 116/216.

As the sample 106/206 is illuminated by the light source 102/202, one or more receiving elements 124/224 and 126/226, shown by lenses 124 and 126 in FIGS. 1A-1B and by Schwarzschild objectives 224 and 226 in FIG. 2, then receive the light from the sample 106/206. Another folding mirror 230 is shown interposed between the receiving elements 224 and 226 in FIG. 2 to again redirect the light path. The detector 110/210 then receives the light and provides a signal indicative of the intensity of the light received at locations across the detector 110/210. This signal can then be processed to provide information about the characteristics of the sample 106/206.

As depicted by an exemplary arrangement in FIG. 2, elements for allowing viewing of sample 106/206 in the visible spectrum (and preferably with magnification) can also be provided in the spectroscopic microscope 200. A source of visible light 232 shines through the folding mirror 228, which is dichroic and is chosen to pass visible light while reflecting other wavelengths. The visible light (depicted by dashed/phantom lines) illuminates the sample stage 108/208 via the objective element (Schwarzschild objective) 218. An eyepiece 234 then allows a user to observe the illuminated sample 106/206 through the (dichroic) folding mirror 230 and receiving element (Schwarzschild objective) 226.

The foregoing arrangement thereby allows critical illumination of a sample 106/206 in a spectroscopic microscope, which is a common arrangement. However, it also allows diffuse Koehler illumination (and spectrometric analysis) of the sample 106/206—in particular, it allows uniform illumination of larger areas of a sample 106/206— which is particularly useful if one wishes to obtain an analysis of sample 106/206 properties which are effectively "averaged" over the area. Thus, critical illumination can be beneficially used over small sample areas (since it will provide sufficiently uniform illumination of small areas), and Koehler illumination can be beneficially used over larger areas.

Further advantages, features, and objects of the invention will be apparent from the following detailed description of the invention in conjunction with the associated drawings.

DETAILED DESCRIPTION OF PREFERRED VERSIONS OF THE INVENTION

Since the foregoing Summary merely reviews preferred versions of the invention, it should be understood that the invention can assume forms which vary widely from those described above. In particular, since the drawings of the microscopes 100 and 200 are merely schematic ones, it should be kept in mind that the microscopes can be constructed with an appearance which is vastly different from that of the microscopes 100 and 200 of FIGS. 1A-1B and 2. The optical elements may assume a wide variety of forms, e.g., refractive (lens, prism, etc.) form or reflective (e.g., mirror) form, or as combinations thereof, though preferences for reflective or refractive forms may need to be exercised depending on the wavelength(s) emitted by the light source 102/202. As an example, where spectrometry is to be performed by use of input infrared (IR) light, reflective elements may be preferred owing to the tendency for (glass) refractive optics to attenuate IR light. Further, optical elements could be combined or added, so that fewer elements serve in place of more elements or vice versa. Folding mirrors can be omitted or added as needed to allow the spectroscopic microscope to meet some desired configuration or space constraint.

Figure 1A:
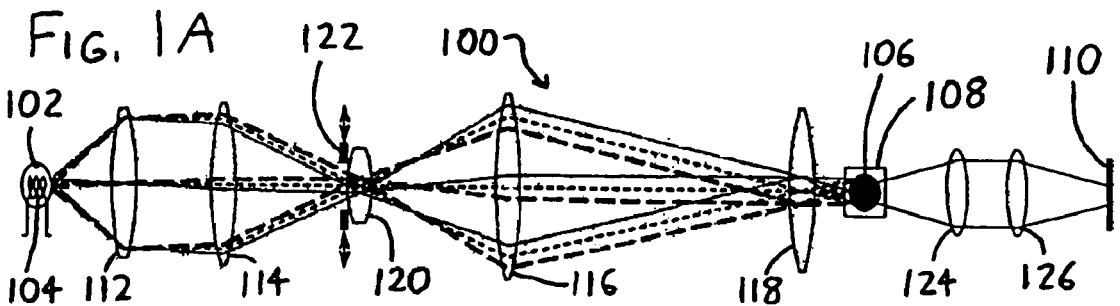
FIG. 1A is a schematic depiction of an exemplary arrangement for spectrometric illumination of a sample 106 via a light source 102, wherein the sample 106 is illuminated via Koehler illumination (i.e., each point on the light source 102 imaged to the sample 106 is imaged across an area of the sample 106, whereby the sample 106 is effectively diffusely illuminated), and the light scattered/reflected, transmitted, and/or emitted by the sample 106 is then measured by a detector 110.
Figure 1B:
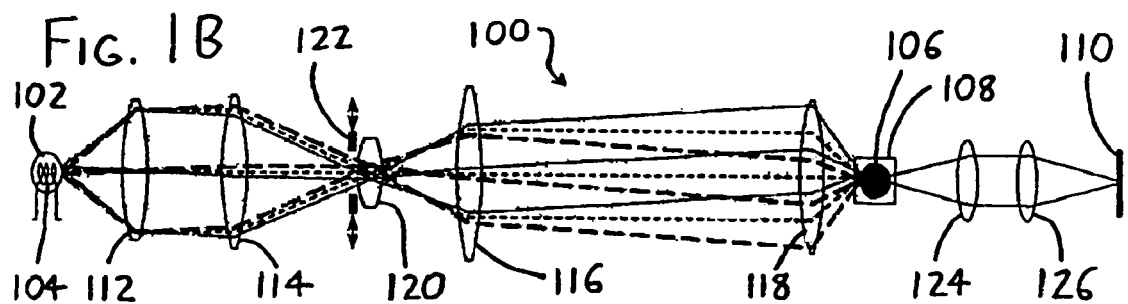
FIG. 1B illustrates the arrangement of FIG. 1 wherein a second condenser lens 116 is moved so as to provide critical illumination of the sample 106 (i.e., each point on the light source 102 imaged to the sample 106 is imaged to a corresponding point on the sample 106, whereby the image of the light source 102 is projected intact onto the sample 106).
Figure 2:
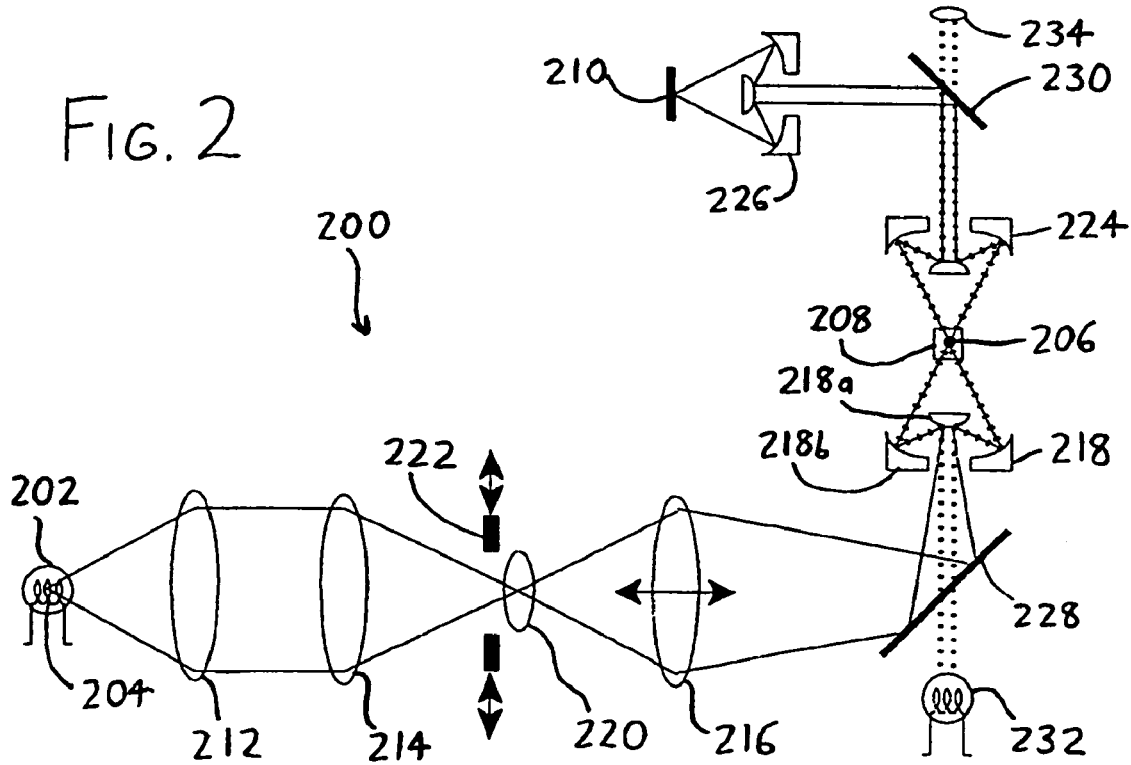
FIG. 2 is a schematic depiction of a spectrometric microscope incorporating the arrangements shown in FIGS. 1A and 1B, wherein the (invisible, e.g., infrared) light source 202 illuminates the sample 206 via optical elements 212, 214, 216, 218, and 220, with element 216 being movable to allow Koehler or critical illumination, so that resulting light from the sample 206 may be measured by the detector 210. At the same or different times, the sample 206 is illuminated by a visible light source 232 so that a user may microscopically view the sample 206 through the eyepiece 234.
Figure 3A:
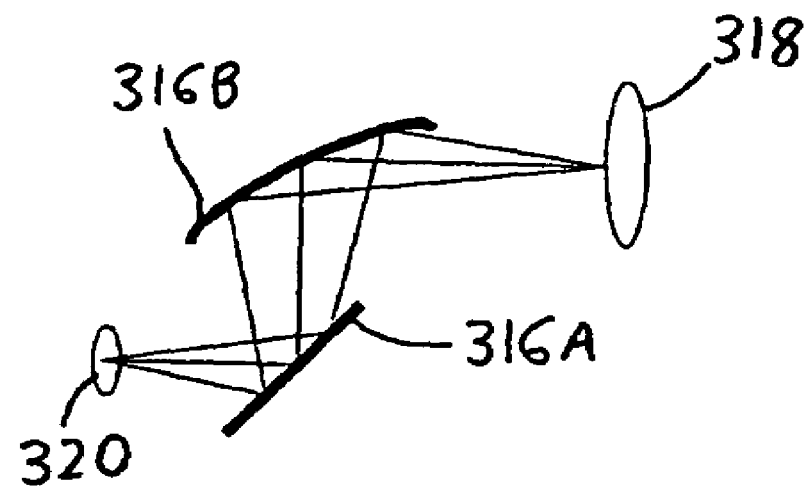
FIGS. 3A-3B schematically illustrate an alternative to the second condenser element (lens) 116 of FIGS. 1A-1B, wherein the second condenser element is formed as a first (planar) mirror 316A and a second (toric) mirror 316B which are connected to move as a unit between the field element 320 and the objective element 318, and from a position providing Koehler illumination (FIG. 3A) to a position providing critical illumination (FIG. 3B).
Figure 3B:
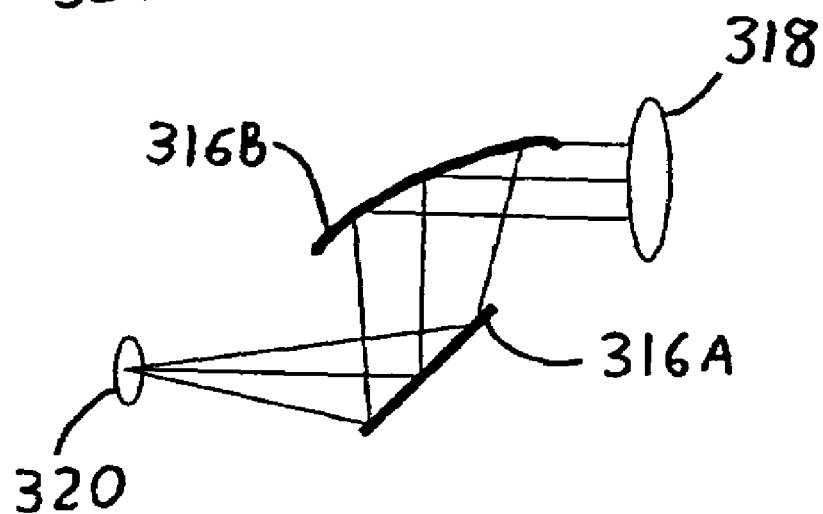

Following the foregoing principles, FIGS. 3A and 3B illustrate yet another alternative arrangement that can be used in place of the second condenser lens 116 of FIGS. 1A-1B and the second condenser lens 216 of FIG. 2. Here, the field lens 320 (corresponding to the field lens 120/220) and the objective lens 318 (corresponding to the objective lens 118/218) have a movable second condenser lens therebetween, with this second condenser lens being formed as a first (planar) mirror 316A and a second (toric) mirror 316B which are connected to move as a unit between locations such as those shown in FIGS. 3A and 3B. As they do so, they vary the illumination from Koehler conditions (as in FIG. 3A, wherein the light from each point on the light source is focused to a corresponding point on the input aperture of the objective lens 318) and critical illumination (as in FIG. 3B, wherein the light from each point on the light source is focused by the objective lens 318 onto a corresponding point on the sample stage).

The foregoing discussion should not be understood to imply that only the optical elements may have varying forms; rather, all components may vary from the illustrated forms. As another example, the illumination sources, both visible and invisible, may assume a variety of forms, e.g., incandescent lamps, arc lamps, blackbody radiating cavities and other lambertian radiators, etc.

The invention can be easily implemented as an addition to preexisting spectrometers and/or microscopes. As an example, the invention can be constructed using an FT-IR spectrometer from the Nicolet series (Thermo Electron, Madison, Wis., USA), with the light source 102 and collector element 112 being provided by the spectrometer lamp and spectrometer collector element (often provided as an off-axis parabolic collection mirror). The first condenser element 114 can be an off-axis diamond turned parabolic mirror, and the field element 120 could be a small toroidal mirror (or an off-axis elliptical mirror), these being custom-manufactured or selected as off-the-shelf components from any number of vendors (such as Janos Technology, Keene, N.H.). The second condenser element 116 could be provided by the mirror system 316A/316B of FIG. 3. The objective element 118 could utilize the one provided in the spectrometer (e.g., a Schwarzchild objective such as the one shown at 218 in FIG. 2).

Both spectrometry and microscopy could be performed in different modes, e.g., in transmittance modes (with the illuminating light being sent through the sample before being detected and/or viewed, as illustrated in FIG. 2) and/or reflectance modes (with the illuminating light being directed onto the sample before being detected and/or viewed). Spectrometry may be performed using a variety of analysis techniques, and may incorporate infrared (IR), near infrared (NIR), ultraviolet (UV-Vis), Raman, and/or other spectrometers (using Fourier Transform (FT) or other analysis techniques); similarly, microscopy may occur in the visible range or in other ranges (e.g., UV fluorescence microscopy).

Since the foregoing discussion is intended to merely present preferred versions of the invention, it should be understood that the invention is not intended to be limited to these preferred versions, but rather is intended to be limited only by the claims set out below. Thus, the invention encompasses all different versions that fall literally or equivalently within the scope of these claims.

What is claimed is:

1. A spectroscopic microscope comprising:
   a. a light source;
   b. a sample stage suitable for bearing a sample for spectrometric analysis;
   c. a detector receiving light from the sample stage;
   d. a Koehler optical system situated between the light source and the sample stage, wherein the Koehler optical system disperses light rays from each point on the light source across an area on the sample stage, the Koehler optical system having at least four optical elements therein, the optical elements including, in series:
      i. a collector element adjacent the light source;
      ii. first and second condenser elements; and
      iii. an objective element adjacent the sample,
      wherein:
      (1) the collector element and the first condenser element are situated in fixed relationship with respect to each other during operation of the microscope; and
      (2) the second condenser element is adjustably repositionable with respect to both the collector element and the first condenser element during operation of the microscope, whereby the Koehler optical system may be adjusted to focus light rays from each point on the light source to a corresponding point on the sample stage.

2. The spectroscopic microscope of claim 1 wherein:
   a. the collector element, the first condenser element, and the objective element are fixed in immobile relationship with respect to each other; and
   b. the second condenser element is adjustably repositionable with respect to the collector element, the first condenser element, and the objective element during operation of the microscope.

3. The spectroscopic microscope of claim 1 further comprising an aperture situated between the first and second condenser elements, the aperture having adjustable size.

4. The spectroscopic microscope of claim 3 further comprising a refractive field element located immediately adjacent or within the aperture, the field element being located at a focal plane of the first condenser element.

5. The spectroscopic microscope of claim 1 wherein the Koehler optical system includes:
   a. a series of several optical elements sequentially delivering light from the light source to the sample, and
   b. an aperture interposed between a pair of the optical elements.

6. The spectroscopic microscope of claim 5 wherein the aperture has adjustable size.

7. The spectroscopic microscope of claim 5 wherein the aperture is adjustably repositionable away from a location between the pair of optical elements during operation of the microscope.

8. The spectroscopic microscope of claim 5 wherein the light source is defined by one of:
   a. an incandescent lamp having at least one filament therein;
   b. an arc lamp having a pair of spaced electrodes; and
   c. a light-emitting cavity.

9. The spectroscopic microscope of claim 1:
   a. wherein the light source emits non-visible light; and
   b. further comprising:
      (1) a second light source emitting visible light, the visible light being received on the sample stage; and
      (2) an eyepiece receiving a visible image of the sample stage.

10. The spectroscopic microscope of claim 1 wherein no refractive elements are situated between the collector element and the first condenser element.

11. The spectroscopic microscope of claim 10 wherein no refractive elements are situated between the second condenser element and the objective element.

12. The spectroscopic microscope of claim 1 wherein no refractive elements are situated between the second condenser element and the objective element.

13. The spectroscopic microscope of claim 12 wherein no refractive elements are situated between the collector element and the first condenser element.

14. A spectroscopic microscopy method in a microscope having:
   a. a light source,
   b. a sample stage bearing a sample for spectrometric analysis,
   c. a series of optical elements situated between the light source and the sample stage, wherein the optical elements include, in series:
      (1) a collector element receiving light from the light source;
      (2) a first condenser element receiving the light from the collector element;
      (3) a second condenser element receiving the light from the first condenser element, and
      (4) an objective element receiving the light from the second condenser element, with the light subsequently being received by the sample, and
   d. a detector receiving light from the sample stage, the method comprising the steps of:
   (1) repositioning the second condenser element with respect to the objective element to adjust between:
      (a) a Koehler illumination position wherein the optical elements disperse light rays from each point on the light source across an area on the sample stage, and
      (b) a critical illumination position wherein the optical elements focus light rays from each point on the light source to corresponding points on the sample stage; and
   (2) capturing light readings from the detector when the optical elements are in at least one of the Koehler illumination position and the critical illumination position.

15. The method of claim 14 further comprising the step of interposing an aperture between the first and second condenser element.

16. The method of claim 15 wherein the step of capturing light readings from the detector is performed after:
   a. the optical elements are in the critical illumination position, and
   b. the aperture is interposed between the first and second condenser elements.

17. The spectroscopic microscope of claim 15 further comprising a refractive field element located immediately adjacent or within the aperture, the field element being located at a focal plane between the first and second condenser elements.

18. The method of claim 14:
   a. wherein an aperture is situated between a pair of the optical elements in the series; and
   b. the method further comprises the step of altering the aperture size.

19. The method of claim 18 wherein the aperture size is altered after the optical elements are adjusted to the critical illumination position.

20. The spectroscopic microscope of claim 14 wherein no refractive elements are situated between the collector element and the first condenser element.

21. The spectroscopic microscope of claim 20 wherein no refractive elements are situated between the second condenser element and the objective element.

22. The spectroscopic microscope of claim 14 wherein no refractive elements are situated between the second condenser element and the objective element.

23. The spectroscopic microscope of claim 22 wherein no refractive elements are situated between the collector element and the first condenser element.

* * * * *